United States Patent [19]

Pernick et al.

[11] Patent Number: 4,932,741
[45] Date of Patent: Jun. 12, 1990

[54] OPTICAL CORRELATOR SYSTEM

[75] Inventors: Benjamin J. Pernick, New York, N.Y.; John V. Fine, Sr., Goose Creek, S.C.

[73] Assignee: Grumman Aerospace Corporation, Bethpage, N.Y.

[21] Appl. No.: 221,992

[22] Filed: Jul. 20, 1988

[51] Int. Cl.⁵ .................... G02B 5/32; G02B 27/42
[52] U.S. Cl. .................... 350/3.73; 350/162.13; 382/42
[58] Field of Search .................. 350/3.6, 3.67, 3.69, 350/3.73, 3.81, 3.82, 162.12, 162.13; 364/822; 382/31, 42

[56] References Cited

U.S. PATENT DOCUMENTS

| | | |
|---|---|---|
| 2,770,166 | 11/1956 | Gabor . |
| 3,240,108 | 3/1966 | Lehan et al. . |
| 3,280,318 | 10/1966 | Gerig et al. . |
| 3,359,851 | 12/1967 | Lipschulz et al. . |
| 3,390,257 | 6/1968 | Lohmann . |
| 3,403,261 | 9/1968 | Bowers et al. . |
| 3,457,425 | 7/1969 | Preston, Jr. . |
| 3,580,655 | 5/1971 | Leith et al. . |
| 3,600,054 | 8/1971 | Gabor . |
| 3,623,024 | 11/1971 | Hamilton ................ 350/162.12 |
| 3,632,182 | 1/1972 | Sincerbox ................ 350/3.67 |
| 3,635,538 | 1/1972 | Caulfield et al. . |
| 3,666,359 | 5/1972 | Lee ........................... 350/162.13 |
| 3,669,521 | 6/1972 | Tait . |
| 3,751,132 | 8/1973 | Croh . |
| 3,779,492 | 12/1973 | Grumet . |
| 3,785,736 | 1/1974 | Spitz et al. ............... 350/162.13 |
| 3,819,911 | 6/1974 | Greenaway . |
| 3,903,400 | 9/1975 | Nisenson . |
| 3,905,019 | 9/1975 | Aoki et al. . |
| 4,073,010 | 2/1978 | Casasent et al. . |
| 4,076,370 | 2/1978 | Wako . |
| 4,421,379 | 12/1983 | Grumet et al. . |
| 4,514,038 | 4/1985 | Pichon et al. ............ 350/162.13 |
| 4,592,004 | 5/1986 | Bocker et al. . |
| 4,637,056 | 1/1987 | Sherman et al. ................ 364/822 |
| 4,695,973 | 9/1987 | Yu ............................... 350/162.13 |
| 4,703,994 | 11/1987 | Leib et al. . |
| 4,810,047 | 3/1989 | Pernick ........................ 350/3.72 |

FOREIGN PATENT DOCUMENTS 1141374 2/1985 U.S.S.R. ........................ 350/3.69

OTHER PUBLICATIONS

"Stacked Optical Memories," by D. Pohl, Applied Optics, vol. 13, No. 2, Feb. 1974, pp. 341-346.
"Multiple Hologram Readout," by J. B. Tait, IBM Technical Disclosure Bulletin, vol. II, No. II, Apr. 1969, p. 1391.
"Multiple Hologram Readout to Single Diode Array," by J. B. Tait, et al., IBM Technical Disclosure Bulletin, vol. II, No. 12, May 1969, p. 1636.

Primary Examiner—Rodney B. Bovernick
Assistant Examiner—R. D. Shafer
Attorney, Agent, or Firm—Scully, Scott, Murphy & Presser

[57] ABSTRACT

An optical correlator system, comprising a laser to generate a signal beam, an image means located in the path of the signal beam to spatially modulate the signal beam, and first and second matched filters. A multiple beam generating holographic lens is located in the path of the modulated signal beam to partially transmit the signal beam and to deflect a first matrix of replicas of the signal beam onto the first matched filter. A mirror is located in the path of the partially transmitted signal beam to reflect that transmitted beam back to the holographic lens, which deflects a second matrix of replicas of the signal beam onto the second matched filter. With an alternate embodiment, a series of holographic lenses and beam splitters are alternatively arranged along the path of the signal beam. Each holographic lens generates two matrices of beams, with each matrix of beams being focused on an associated matched filter. Each beam splitter partially reflects the signal beam back to the preceding holographic lens, and partially transmits the signal beam to the following holographic lens.

8 Claims, 2 Drawing Sheets

OPTICAL CORRELATOR SYSTEM

BACKGROUND OF THE INVENTION

This invention generally relates to optical correlator systems; and more specifically, to multiple array optical correlator systems.

Optical correlator systems are used to detect the presence of a selected target in a scene or a field of view. In an optical correlator system, a coherent light beam is passed through a view or scene, which may include the selected target, and then transmitted through a matched filter. The matched filter contains a recording of a diffraction pattern unique to the selected target; and if the selected target is present in the submitted view, the matched filter redirects a portion of the beam incident on it into a relatively intense output beam at a selected angle relative to the incident beam, and an inverse transform lens brings this output beam from the matched filter to a focus. However, if the selected target is not present in the submitted view, any output beam of the matched filter at this selected angle is relatively weak and diffused, and this output beam remains relatively diffused as it passes through the inverse transform lens. A light sensitive detector is located in the focal plane of the inverse transform lens; and when light of a sufficient intensity is focused on that detector, an output signal is produced. This output signal is used to trigger some type of device, which, depending on the apparatus in which the target recognition system is used, might be a simple alarm or a complex robotic guidance system, for example.

The capacity of an optical correlator system can be significantly increased by providing the system with a multitude of recorded diffraction patterns; and this may be done by using an array of matched filters, each of which has one recorded diffraction pattern, or by using one or an array of matched filters each of which has a multitude of diffraction patterns. Each of the diffraction patterns employed in the system may be unique to a respective view of one target, or these diffraction patterns may represent plural targets; and a correlator system having a multitude of such diffraction patterns may be used to detect a target in a scene independent of the orientation of the target in that scene, or to detect plural targets in one scene.

In order to improve the response time and the storage capacity of a correlator system having a multitude of recorded diffraction patterns, commonly the modulated signal beam is replicated manyfold, and each replica beam is focused on a respective one of the recorded diffraction patterns. Various prior art techniques are known to replicate the modulated signal beam, and, for example, a multiple beam generating holographic lens may be used for this purpose. While these prior art arrangements are normally satisfactory, it is nonetheless believed that their efficiency can be improved.

SUMMARY OF THE INVENTION

An object of this invention is to use a multiple beam generating holographic lens twice, at the same time, to produce two matrices of beams, with each of these beams being a replica of a modulated signal beam.

Another object of the present invention is to conduct a signal beam twice through a multiple beam generating holographic lens, first from the front to the back of the lens and then from the back to the front of the lens, to produce two matrices of beams each of which is a replica of the signal beam.

A further object of this invention is to use one multiple beam generating holographic lens to produce two matrices of beams, each of which is a replica of one signal beam; and to focus each beam of the first matrix on a first matched filter, and each beam of the second matrix on a second matched filter.

These and other objectives are obtained with an optical correlator system, comprising means for generating a collimated signal beam; image means located in the path of the signal beam to spatially modulate that beam; and first and second matched filters, each of which has a plurality of recorded diffraction patterns or optical memories. A multiple beam generating holographic lens is located in the path of the modulated signal beam to partially transmit the signal beam and to deflect a matrix of replicas of the modulated signal beam toward the first matched filter, with each of the first matrix of replicas of the signal beam being focused on a respective one of the diffraction patterns of that first matched filter.

A mirror is located in the path of the signal beam partially transmitted through the multiple beam generating holographic lens to reflect that transmitted signal beam back to the multiple beam generating holographic lens. As this reflected signal beam passes through the multiple holographic lens, that lens deflects a second matrix of replicas of the signal beam onto the second matched filter, with each of the second matrix of replicas of the signal beam being focused on a respective one of the diffraction patterns of the second matched filter. Optical detection means is located in the paths of output beams of the first and second matched filters to generate a signal when the correlation between the pattern of one of the beams focused on the matched filters and the optical memory on which said one of the beams is focused, rises above a predetermined value.

With an alternate embodiment, a series of multiple beam generating holographic lenses and beam-splitters are alternately arranged along the path of the signal beam. Each multiple beam generating holographic lens generates two, first order matrices of beams, with each matrix of beams being focused on an associated matched filter. Each beam-splitter partially reflects the signal beam back to the immediately preceding multiple holographic lens, and partially transmits the signal beam to the immediately following multiple holographic lens. Preferably, an inverse transform lens and an optical detector is associated with each matched filter of this system so that if a selected correlation exists between the pattern of one of the beams passing through a matched filter and the optical memory on which that one beam is focused, the associated inverse transform lens focuses an output beam of that matched filter onto the associated detector to trigger an alarm signal.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
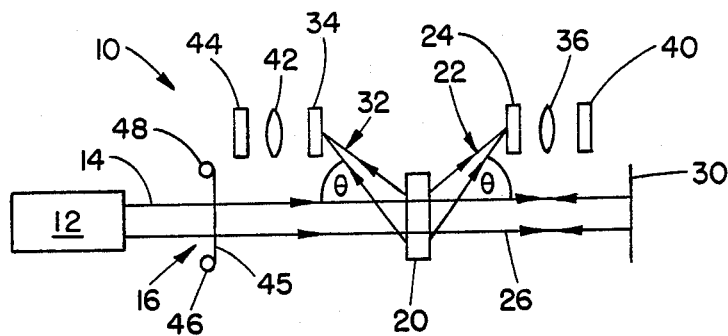
FIG. 1 is a schematic drawing of an optical correlator system according to a first embodiment of this invention.
Figure 2:
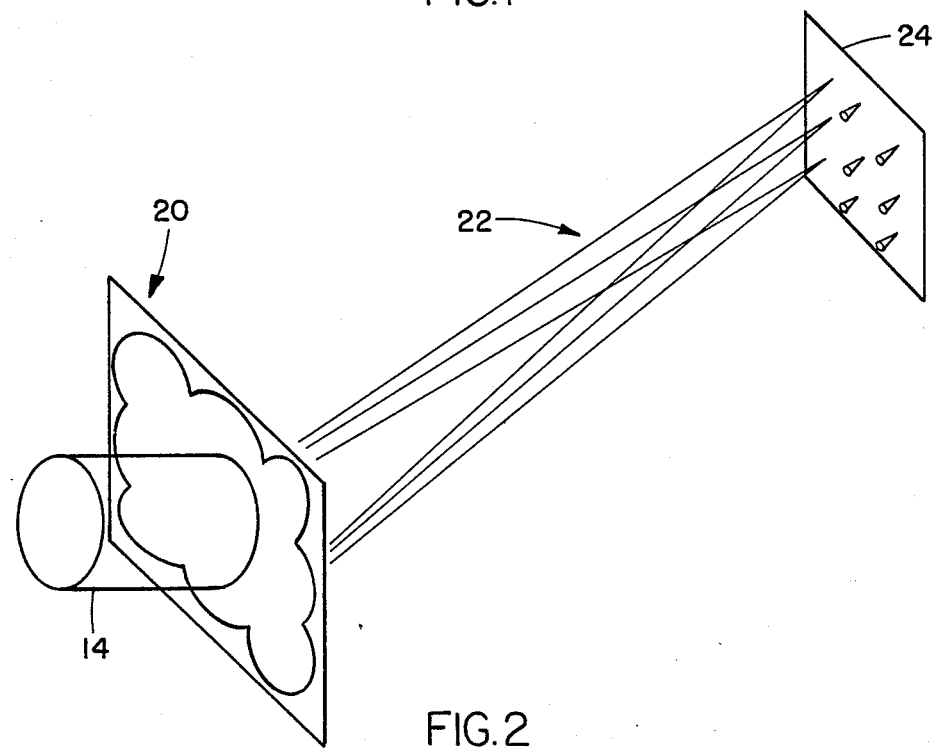
FIG. 2 is an enlarged view of a portion of FIG. 1, schematically showing in detail the output of the multiple beam generating holographic lens thereof.

FIG. 1 shows system 10, in which a source of monochromatic collimated light energy of substantially fixed wavelength such as laser 12 produces an output beam 14, referred to as the signal beam, and directs that beam through imaging means 16 and holographic element 20. Imaging means 16 is used to expose to the signal beam one or more scenes suspected of having one or more selected targets; and as the signal beam passes through the scene on the imaging means, the signal beam becomes amplitude and/or phase modulated with the imagery on that scene. Element 20, which preferably is a multiple beam generating holographic lens, deflects a series or matrix of output beams, generally represented at 22, converging at an angle $\Theta$ to the axis of the signal beam and onto matched filter 24. Each beam of matrix 22 is spatially modulated in the same way as the beam incident on holographic lens 20, and this matrix is referred to as a first order matrix of that lens. With reference to FIG. 2, the individual beams of matrix 22 have substantially parallel axes and are focused on different areas of matched filter 24. For purposes of explaining the present invention, the output of holographic lens 20 is shown in FIG. 2 to be a 3×3 matrix of identical beams, but this is not to be considered as a limitation of the invention in any way.

Element 20 also partially transmits the signal beam along the axis thereof. This output beam 26, referred to as the zero order output beam of the holographic lens 20, is reflected by mirror 30 back along the axis of signal beam 14 and back through holographic lens 20. As the reflected signal beam passes again through holographic lens 20, from right to left as viewed in FIG. 1, the multiple beam generating holographic lens again deflects a first order matrix of beams, generally represented at 32, onto matched filter 34 and converging at an angle $\Theta$ to the axis of the incident signal beam. Each of the beams of matrix 32 also is a replica of the incident beam and thus is spatially modulated in the same way as that incident beam. Similar to the beams of matrix 22 shown in FIG. 2, the individual beams of matrix 32 have substantially parallel axes and are focused on different areas of matched filter 34.

When imaging means 16 and matched filters 24 and 34 are spaced from the multiple holographic lens 20 by the focal distance of the hologram, the lens 20 performs a Fourier transform of all the imagery on the scene exposed to the signal beam by imaging means 16. Each of the beams of matrices 22 and 32 is a first order component of the hologram 20, and these multiple beams constitute many replicas of the diffraction patterns of all the imagery on the input scene exposed to the signal beam.

A multitude of diffraction patterns, referred to as optical memories, are recorded in matched filters 24 and 34, and each of these diffraction patterns represents a view of the suspected target or targets. Each beam of matrix 22 is focused on and passes through a respective one of the optical memories recorded in the matched filter 24, and each beam of matrix 32 is focused on and passes through a respective diffraction pattern of filter 34. Optical detection means, preferably comprising inverse transform lenses 36 and 42 and photodetectors 40 and 44, is located in the paths of output beams of matched filters 24 and 34 to generate a signal when the correlation between the pattern of one of the beams focused on the matched filters and the optical memory on which that one of the beams is focused, rises above a predetermined value.

If the target view represented by a particular diffraction pattern recorded in filter 24 is present in the scene exposed to signal beam 14 at imaging means 16, then the matched filter redirects a portion of the beam passing through that diffraction pattern into a relatively intense output beam at a selected angle relative to the incident beam. If this happens, inverse transform lens 36 focuses that output beam of filter 24 onto detector 40, triggering an alarm signal. Analogously, if the target view represented by a particular diffraction pattern of filter 34 is present in the scene exposed to signal beam 14 at imaging means 16, then the matched filter redirects a portion of the beam passing through that diffraction pattern into a relatively intense output beam at a selected angle relative to the incident beam; and if this happens, inverse transform lens 42 focuses that output beam of filter 34 onto detector 44, triggering an alarm signal.

If none of the target views represented by the diffraction patterns of matched filters 24 and 34 is present in the scene exposed to the signal beam 14 by imaging means 16, then any output beams of the matched filters 24 and 34 are all relatively weak and diffused. Any of these beams that pass through lenses 36 and 42 remain weak and diffused, and the beams do not activate detectors 40 or 44 to trigger the associated alarms.

Laser 12 preferably is of the gaseous type such as an argon ion laser producing a continuous output at a wavelength near 5,000 angstroms, but suitable lasers of other types such as a semiconductor type, an yttrium aluminum garnet (YAG) or helium-neon continuous wave laser, a carbon dioxide laser or a pulsed laser can also be employed in system 10.

Figure 3:
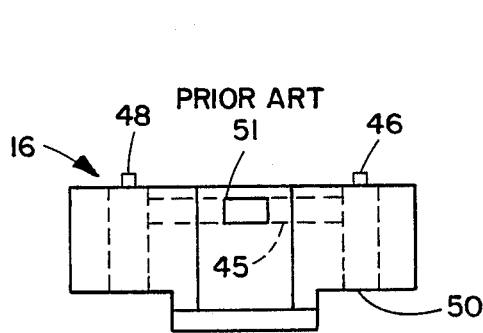
FIGS. 3 and 4 are simplified front views of imaging means that may be used in the system of FIG. 1.

Various types of imaging means 16 may be used in system 10; and for example, as represented in FIGS. 1 and 3, the imaging means may comprise a film 45 connected to a pair of spaced spools or rollers 46 and 48. Initially, the film is wound around first spool 46, and in use, any suitable drive means (not shown) is connected to second spool 48 to rotate that roller and advance the film transversely in a plurality of discrete steps across the path of signal beam 14. The film and rollers 46 and 48 may be housed in a liquid gate 50 having a pair of aligned windows 51 positioned to allow the signal beam 14 to pass through the housing and to expose the film therein to that signal beam.

Figure 4:
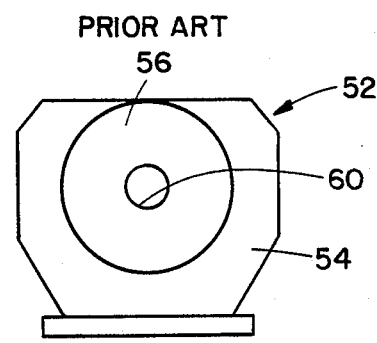

Alternatively, with reference to FIG. 4, the imaging means may comprise a rotating liquid gate 52 including stationary frame 54 and rotatable plate 56 internal to the frame. Plate 56 includes a central opening or window 60 for holding a picture of a selected view or object, and the plate is supported by frame 54 for rotation about the axis of that central opening. A stepper motor (not shown) is supported by frame 54 and connected to plate 56 by any suitable drive mechanism (also not shown) to rotate the plate, and thus the picture held in opening 60, about the axis of that opening, through a plurality of discrete annular steps. Rotatable linear gates are also known in the art and may be used in the practice of this invention.

Figure 5:
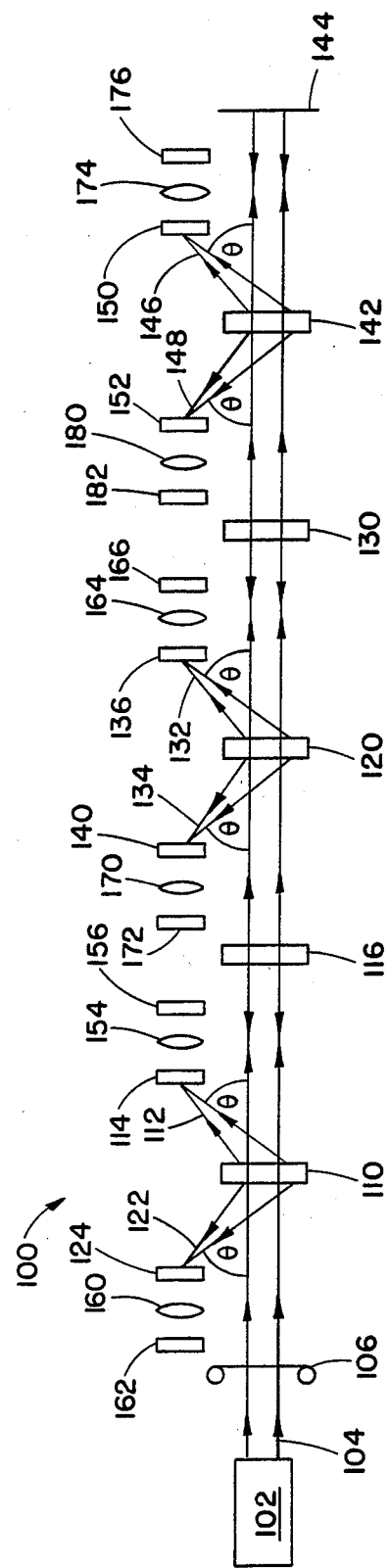
FIG. 5 is a schematic diagram of an optical correlator system according to a second embodiment of the present invention.

FIG. 5 illustrates a second embodiment 100 of the present invention, and in which a series of multiple beam generating holographic lenses and beam-splitters are alternately arranged along the path of the signal beam. Each multiple beam generating holographic lens partially transmits the signal beam and generates two, first order matrices of beams, with each matrix of beams focused on an associated matched filter; and each beam-splitter partially reflects the signal beam back to the immediately preceding multiple holographic lens, and partially transmits the signal beam to the immediately following multiple holographic lens.

More specifically, laser 102 generates signal beam 104, which initially passes through imaging means 106 and then through multiple holographic lens 110, from left to right as viewed in FIG. 5. Similar to imaging means 16 of system 10, imaging means 106 exposes to the signal beam one or more scenes suspected of having one or more selected targets; and as the signal beam passes through the scene exposed to it, the signal beam becomes amplitude modulated with the imagery on that scene. As the modulated signal beam 104 passes through the holographic lens 110, a first order matrix of replica beams 112 is deflected at an angle $\Theta$ from the signal beam axis and onto an associated matched filter 114. Holographic lens 110 also partially transmits signal beam 104 along the axis thereof. This output beam of the lens is referred to as the zero order or undeflected, output beam of holographic lens 110, and is conducted to beam-splitter 116. This beam-splitter, first, partially reflects the signal beam back to multiple holographic lens 110, and second, partially transmits the signal beam to the next multiple beam generating holographic lens 120.

The partially reflected signal beam passes back through lens 110, from right to left as viewed in FIG. 5, and this lens deflects a first order matrix 122 of replica beams at an angle $\Theta$ from the signal beam axis and onto an associated matched filter 124. The partially transmitted signal beam from beam-splitter 116 passes to lens 120 and to beam-splitter 130 which, in a manner similar to the way in which lens 110 and beam-splitter 116 function, produce two first order matrices 132 and 134 of replica beams, each of which is deflected onto an associated matched filter 136 and 140 respectively, at an angle $\Theta$ to the signal beam axis. Beam-splitter 130 also partially transmits the signal beam to multiple beam generating holographic lens 142 and mirror 144, which operate in a manner similar to lens 20 and mirror 30 of system 10 to produce two additional first order matrices 146 and 148 of beams, each of which is at an angle $\Theta$ to the signal beam axis, and each of which is deflected onto a respective matched filter 150 and 152.

An inverse transform lens and an optical detector is associated with each matched filter of system 100, and these matched filters, lenses and detectors operate in a manner similar to the way in which matched filters 24 and 34, lenses 36 and 42 and detectors 40 and 44 of system 10 operate to produce an alarm if a given view of one or more targets is exposed to signal beam 104 at imaging means 106. More specifically, lens 154 and detector 156 are located adjacent matched filter 114, lens 160 and detector 162 are located adjacent filter 124, and lens 164 and detector 166 are located adjacent filter 136 Lens 170 and detector 172 are located adjacent filter 140, lens 174 and detector 176 are located adjacent matched filter 150, and lens 180 and detector 182 are located adjacent to filter 152.

A multitude of diffraction patterns are recorded on each matched filter, and each of these patterns represents a view of a suspected target or targets. Each beam of matrix 112 is focused on and passes through a respective one of the diffraction patterns recorded on the matched filter 114, and each beam of matrix 122 is focused on and passes through a respective one of the diffraction patterns recorded in the matched filter 124. Each beam of matrix 132 is focused on and passes through a respective one of the diffraction patterns recorded in the matched filter 136, and each beam of matrix 134 is focused on and passes through a respective one of the diffraction patterns recorded in the matched filter 140. Similarly, each beam of matrix 146 is focused on and passes through a respective one of the diffraction patterns recorded in the matched filter 150, and each beam of matrix 148 is focused on and passes through a respective one of the diffraction patterns recorded in the matched filter 152.

If the target view represented by a particular diffraction pattern on a given one of filters 114, 124, 136, 140, 150 or 152 is present in the scene exposed to signal beam 104 at imaging means 106, then that given matched filter redirects a portion of the beam passing through that diffraction pattern into a relatively intense output beam at a selected angle relative to the incident beam, and the associated inverse transform lens focuses that output beam onto the associated detector, triggering an alarm signal. However, if none of the target views represented by the diffraction patterns of the matched filters of system 100 is present in the scene exposed to the signal beam 104 at imaging means 106, then any output beams of the matched filters of system 100 are relatively weak and diffused. Any of these beams that pass through the inverse transform lenses of system 100 remain weak and diffused, and the beams do not activate the detectors of system 100 to trigger the associated alarms.

As will be understood by those of ordinary skill in the art, system 100 of FIG. 5 may be expanded to include more than three multiple holographic lens without departing from the scope of this invention. For example, to further increase the capacity of system 100, mirror 144 may be moved to the right as viewed in FIG. 5, and additional multiple holographic lenses and beam-splitters may be placed in an alternating sequence on the signal beam axis, between holographic lens 142 and mirror 144. The limit of the number of multiple beam generating holographic lenses and beam-splitters that may be employed in system 100 is determined principally by the strength of the beam from laser 102 and the extent to which that signal is attenuated by the optical elements placed in its path. Likewise, it is not necessary that system 100 have three multiple beam generating holographic lenses; and, for instance, the system may be modified to have only two multiple beam generating holographic lenses by removing lens 120 and beam-splitter 130.

Any suitable optical detectors may be used in the practice of the present invention. For instance, each detector of systems 10 or 100 may comprise a single photosensitive cell positioned so that all of the light beams passing through the associated inverse transform lens and matched filter are incident on the photosensitive cell. Alternatively, each detector may comprise an array of photosensitive cells, with each of these cells positioned so that a respective one, or more, of the light beams passing through the associated inverse transform lens and matched filters is incident on the photosensitive cell.

Similarly, any suitable multiple beam generating holographic lenses, mirrors, beam-splitters, matched filters and inverse transform lens may be used in systems 10 and 100. Numerous such devices are well known in the art, and it is unnecessary to describe these devices in detail herein. For example, U.S. Pat. No. 4,703,994 describes one procedure to make a matched filter having an array of optical memories; and U.S. Pat. No. 4,421,879 discloses a process for making a multiple beam generating holographic lens.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. An optical correlator system comprising:
   means for generating a collimated signal beam;
   image means located in the path of the signal beam to spatially modulate the signal beam;
   first and second matched filters, each of the matched filters having a plurality of optical memories;
   a multiple beam generating holographic lens located in the path of the modulated signal beam to partially transmit the signal beam and to deflect a first matrix of replicas of the signal beam onto the first matched filter, with each of the first matrix of replicas of the signal beam being focused on a respective one of the optical memories of the first matched filter;
   a mirror located in the path of the partially transmitted signal beam to reflect the partially transmitted signal beam back to the multiple beam generating holographic lens, wherein the multiple beam generating holographic lens deflects a second matrix of replicas of the signal beam onto the second matched filter, with each of the second matrix of replicas of the signal beam being focused on a respective one of the optical memories of the second matched filter; and
   optical detection means located in the paths of output beams of the first and second matched filters to generate a signal when the correlation between the pattern of one of the beams focused on the matched filters and the optical memory on which said one of the beams is focused, rises above a predetermined value.

2. An optical correlator system according to claim 1, wherein:
   the signal beam defines a signal beam axis; and
   the multiple beam generating holographic lens and the mirror are located on the signal beam axis.

3. An optical correlator system according to claim 2, wherein:
   the multiple beam generating holographic lens deflects the first and the second matrices of replicas of the signal beam on first and second deflection axes respectively; and
   the first and second matched filters are located on the first and second deflection axes respectively.

4. An optical correlator system according to claim 3, wherein:
   the signal beam axis and the first deflection axis intersect at a given angle; and
   the signal beam axis and the second deflection axis also intersect at said given angle.

5. An optical correlator system, comprising:
   means for generating a collimated signal beam;
   image means located in the path of the signal beam to spatially modulate the signal beam;
   first and second matched filters, each of the matched filters having a plurality of optical memories;
   a first multiple beam generating holographic lens located in the path of the modulated signal beam to partially transmit the signal beam and to deflect a first matrix of replicas of the signal beam onto the first matched filter, each of the first matrix of replicas of the signal beam being focused on a respective one of the optical memories of the first matched filter;
   a first beam-splitter located in the path of the partially transmitted signal beam transmitted through the first multiple beam holographic lens to further partially transmit the signal beam and to partially reflect the signal beam back to the first multiple beam generating holographic lens, wherein the first multiple beam generating holographic lens deflects a second matrix of replicas of the signal beam onto the second matched filter, each of the second matrix of replicas of the signal beam being focused on a respective one of the optical memories of the second matched filter;
   third and fourth matched filters, each of the third and fourth matched filters having a plurality of optical memories;
   a second multiple beam generating holographic lens located in the path of the partially transmitted signal beam transmitted by the beam splitter to further partially transmit the signal beam and to deflect a third matrix of replicas of the signal beam onto the third matched filter, each of the third matrix of replicas of the signal beam being focused on a respective one of the optical memories of the third matched filter;
   a mirror located in the path of the partially transmitted signal beam transmitted by the second multiple beam generating holographic lens to reflect the transmitted signal beam back to the second multiple beam generating holographic lens, wherein the second multiple beam generating holographic lens deflects a fourth matrix of replicas of the signal beam onto the fourth matched filter, with each of the fourth matrix of replicas of the signal beam being focused on a respective one of the optical memories of the fourth matched filter; and
   optical detection means located in the paths of output beams of the first, second, third and fourth matched filters to generate a signal when the correlation between the pattern of one of the beams focused on the matched filters and the optical memory on which said one of the beams is focused, rise above a predetermined value.

6. An optical correlator system according to claim 5, wherein:
   the signal beam defines an axis; and
   each of the first and second multiple beam generating holographic lens, the beam-splitter and the mirror are located on said axis.

7. An optical correlator system comprising:

means for generating a collimated signal beam and directing said beam along a path;

image means located in the path of the signal beam to spatially modulate the signal beam;

a multitude of matched filters, each of the matched filters having a plurality of optical memories;

a multitude of multiple beam generating holographic lenses and beam-splitters alternately arranged in the path of the signal beam; each multiple beam generating holographic lens partially transmitting the signal beam and generating two, first order matrices of beams spatially modulated the same as the signal beam, each matrix of beams being focused on a respective one of the matched filters; each beam-splitter partially reflecting the signal beam back to an immediately preceding multiple beam generating holographic lens, and partially transmitting the signal beam to an immediately following multiple beam generating holographic lens; and optical detection means located in the paths of output beams of the matched filters to generate a signal when the correlation between the pattern of one of the beams focused on the matched filters and the optical memory on which said one of the beams is focused, rises above a predetermined value.

8. An optical correlator system according to claim 7, wherein:

the signal beam defines an axis; and the multiple beam generating holographic lenses, and the beam-splitters are located on said axis.

* * * * *